US008723648B2

(12) United States Patent
Attew (10) Patent No.: US 8,723,648 B2
(45) Date of Patent: May 13, 2014

(54) METHOD AND SYSTEM FOR LOCATING A HAND-HELD TERMINAL

(75) Inventor: Vernon Jon Attew, Milton (CA)

(73) Assignee: Psion Inc., Mississauga, Ontario (CA)

( * ) Notice: Subject to any disclaimer, the term of this patent is extended or adjusted under 35 U.S.C. 154(b) by 544 days.

(21) Appl. No.: 12/650,087

(22) Filed: Dec. 30, 2009

(65) Prior Publication Data

US 2011/0156870 A1    Jun. 30, 2011

(51) Int. Cl.
*H04Q 5/22* (2006.01)

(52) U.S. Cl.
USPC ............................................. 340/10.1

(58) Field of Classification Search
USPC ............. 340/10.1, 505, 514, 12.5; 235/385
See application file for complete search history.

(56) References Cited

U.S. PATENT DOCUMENTS

| 7,005,968 | B1 | 2/2006 | Bridgelall |
| 7,084,740 | B2 | 8/2006 | Bridgelall |
| 7,319,397 | B2* | 1/2008 | Chung et al. ............... 340/572.4 |
| 7,403,120 | B2* | 7/2008 | Duron et al. ............... 340/572.1 |
| 2005/0140507 | A1* | 6/2005 | Nam et al. ................ 340/539.13 |
| 2006/0022038 | A1* | 2/2006 | Hewlin et al. .................. 235/385 |
| 2006/0033609 | A1 | 2/2006 | Bridgelall |
| 2007/0075873 | A1 | 4/2007 | Yang et al. |
| 2007/0184851 | A1* | 8/2007 | Barnwell et al. ........... 455/456.1 |
| 2008/0186136 | A1 | 8/2008 | Rapaheli et al. |
| 2010/0066503 | A1 | 3/2010 | Rhie et al. |

FOREIGN PATENT DOCUMENTS

| WO | 0194967 A2 | 12/2001 |
| WO | 2006030422 A2 | 3/2006 |
| WO | 2008143483 A1 | 11/2008 |

OTHER PUBLICATIONS

European Search Report mailed Apr. 13, 2011 in Counterpart European Patent Application No. 10191177.4.

* cited by examiner

Primary Examiner — Vernal Brown (57) ABSTRACT

A system and a method for determining the location of an RFID reader is provided. The system includes a plurality of transmitters which have a known reference point. Each transmitter includes a circuit for transmitting a sequence of unique RFID pseudo tag signals. Each unique RFID pseudo signal in the sequence has a unique range of transmission. Each unique RFID pseudo tag in the sequence has a tag identification indicating the range of transmission of the pseudo tag signal and a transmitter identification value indicating the transmitter from which the pseudo tag signal was transmitted. An RFID reader receives the unique RFID pseudo tag signals and distinguishes between each received unique RFID pseudo tag signal. A location calculator calculates the location of the RFID reader based on the information received.

18 Claims, 5 Drawing Sheets

| 32 | 64 | 16 | 48 | 8  | 24 | 40 | 56 |
|----|----|----|----|----|----|----|----|
| 4  | 12 | 20 | 28 | 36 | 44 | 52 | 60 |
| 2  | 6  | 10 | 14 | 18 | 22 | 26 | 30 |
| 34 | 38 | 42 | 46 | 50 | 54 | 58 | 62 |
| 1  | 3  | 5  | 7  | 9  | 11 | 13 | 15 |
| 17 | 19 | 21 | 23 | 25 | 27 | 29 | 31 |
| 33 | 35 | 37 | 39 | 41 | 43 | 45 | 47 |
| 49 | 51 | 53 | 55 | 57 | 59 | 61 | 63 |

FIG. 5

METHOD AND SYSTEM FOR LOCATING A HAND-HELD TERMINAL

FIELD OF INVENTION

The present invention relates to hand-held terminals and more specifically relates to the determination of the location of a hand-held terminal.

BACKGROUND OF THE INVENTION

In warehousing applications, knowing the whereabouts of a reader such as a hand-held terminal when it scans a product can be very important. The classic solution involves barcoding or tagging key locations in the warehouse, and getting the operator of the hand-held terminal to scan one of these codes after scanning a product. This is a reasonably effective and cheap approach to the determination of the location of the hand-held terminal. However, this approach can be time consuming and is subject to operator error and/or misuse. An alternative approach is to fit each hand-held terminal with a global positioning system (GPS). This is an expensive solution with many drawbacks including the loss of the satellite signal in any warehouse with a metal roof. An additional drawback is that the number of hand-held terminals, for example, radio frequency identification (RFID) readers on the market that are capable of accepting a GPS card is also quite limited.

The use of RFID readers is becoming more popular and as such a need exists for a system for and method of determining the location of an RFID reader such as an RFID hand-held terminal.

SUMMARY OF THE INVENTION

One aspect of the present invention provides a system that allows an RFID reader to determine its location using only the RFID radio.

The invention according to an aspect of the invention provides a system for determining a location of an RFID reader. The system includes transmitters having known reference points, each transmitter comprises a simulation circuit for transmitting a sequence of unique RFID pseudo tag signals. Each unique RFID pseudo tag signal in the sequence has a unique range of transmission, and includes a tag identification indicating the range of transmission of the pseudo tag signal and a transmitter identification value indicating the transmitter transmitting the pseudo tag signal. The system further includes an RFID reader. The RFID reader receives sequences of the unique RFID pseudo tag signals from the transmitters, and distinguishes between the received unique RFID pseudo tag signals. The system further includes a location calculator for calculating the location of the RFID reader based on the received tag identifications and the received transmitter identification values.

Preferably, each unique RFID pseudo tag signal in the sequence has a progressively weaker signal and therefore a progressively shorter range of transmission such that the number of unique RFID pseudo tags received by the RFID reader is inversely proportional to its distance from the transmitter.

Preferably, the system has three transmitters, and the location calculator triangulates the location of the RFID reader based on the range of transmission indicated in the tag identification and the location of the transmitter in the transmitter identification value.

Preferably, the location calculator is in the RFID reader.

Preferably, the RFID reader notifies a user once the location calculator has successfully calculated the location of the RFID reader.

Preferably, the location calculator comprises an algorithm for applying a greater weight to the unique pseudo RFID tag signals having a shorter range of transmission relative to pseudo RFID tag signals received from transmitters having a longer range.

Preferably, the location calculator comprises an algorithm for accumulating location information over time using a rolling average to generate a locational history and substantially determining what a current location of the RFID reader is based on the locational history.

Preferably, the system has four transmitters, and triangulation calculations are performed to determine the location of the RFID reader based on the tag identifications and the transmitter identification values.

Preferably, the location calculator is located in a server computer and the tag identification and the transmitter identification value of received pseudo tag signals are transmitted from the RFID reader to the location calculator in the server computer.

The invention according to another aspect of the invention provides a method of determining the location of an RFID reader, the method comprising: transmitting a sequence of unique RFID pseudo tag signals from a plurality of sources to the RFID reader, each source having a known reference point, each unique RFID pseudo tag signal in the sequence comprising a tag identification indicating the range of transmission of the unique RFID pseudo tag signal and a transmitter identification value indicating the source from which the RFID pseudo tag signal is transmitted; receiving a plurality of sequences of the unique RFID pseudo tag signals from the plurality of sources, distinguishing between each unique RFID pseudo tag received by the RFID reader; and calculating the location of the RFID reader based on the plurality of the received tag identifications and plurality of the received transmitter identification values.

Preferably, each unique RFID pseudo tag in the sequence has a progressively weaker signal and therefore a progressively decreased range of transmission such that the number of unique RFID pseudo tag signals received by the RFID reader is inversely proportional to its distance from the source.

Preferably, the method further comprises discarding any tag identifications received by the RFID reader which have the same transmitter identification value and a tag identification indicating a range of transmission higher than a minimum received by the RFID reader resulting in a minimum range tag identification for each source; and wherein the calculating comprises calculating the location of the RFID reader based on the minimum range tag identification for each source and the transmitter identification value for each minimum range tag identification.

Preferably, the unique RFID pseudo tag signals are from three sources, the method further comprises: calculating the location of the RFID reader by triangulation of the RFID reader based on the range of transmission indicated in the tag identification and the location of the source in the transmitter identification value in the unique RFID pseudo tags.

Preferably, the RFID reader calculates the location.

Preferably, the method further comprises: notifying a user once the location of the RFID reader has been successfully calculated.

Preferably, the unique RFID pseudo tag signals are from three sources, the method further comprises: applying a greater weight to RFID pseudo tags received by the RFID reader from sources which are closer in distance to the RFID reader.

Preferably, the unique RFID pseudo tag signals are from three sources, the method further comprises: accumulating location information over time using a rolling average to generate a locational history; and determining what a current location of the RFID reader is based on the range of transmission indicated in the tag identification and the location of the source from which each pseudo tag signal was transmitted obtainable from the transmitter identification value in the unique RFID pseudo tags received by the RFID reader and on the locational history.

Preferably, a server calculates the location of the RFID reader, the method further comprises: transmitting a signal from the server to the RFID reader upon successful calculation of the location of the RFID reader; and notifying the user upon receipt of the signal indicating a successful calculation.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations have not been described in detail in order not to unnecessarily obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The term "radio-frequency identification tag" or "RFID tag" is intended to describe an object applied to or incorporated into an object for identifying and tracking purpose using radio waves. RFID tags generally include an integrated circuit for storing and processing information, a circuit for modulating and demodulating an RF signal, and an antenna for receiving and transmitting the signal. RFID tags may be active RFID tags including a battery, or passive RFID tags with no battery.

The term "radio-frequency identification reader" or "RFID reader" or "reader" or "interrogator" is intended to describe a device for remotely retrieving data stored in RFID tags.

The term "pseudo tag" as used in this patent disclosure is intended to describe a simulated RFID tag which is capable of transmitting an RF signal to an RFID reader. This signal is used by the RFID reader in determining the current location of the RFID reader. Accordingly, the term "real tag" is used in this patent disclosure to describe an RFID tag which is used for the purpose of identifying and tracking an object.

The term "tag signal" and the variations thereof such as "real tag signal" and "pseudo tag signal" are intended to describe the signal transmitted by the respective real and pseudo RFID tags.

The term "triangulation" or "trilateration" is intended to describe a process for determining location of a point by measuring or calculating the distance between the point and other points with known locations.

Embodiments of the present invention provide a system for and method of determining the location of an RFID reader including mobile and hand held RFID readers, using pseudo tags, that are transmitted from known locations, for example, fixed locations.

Figure 1:
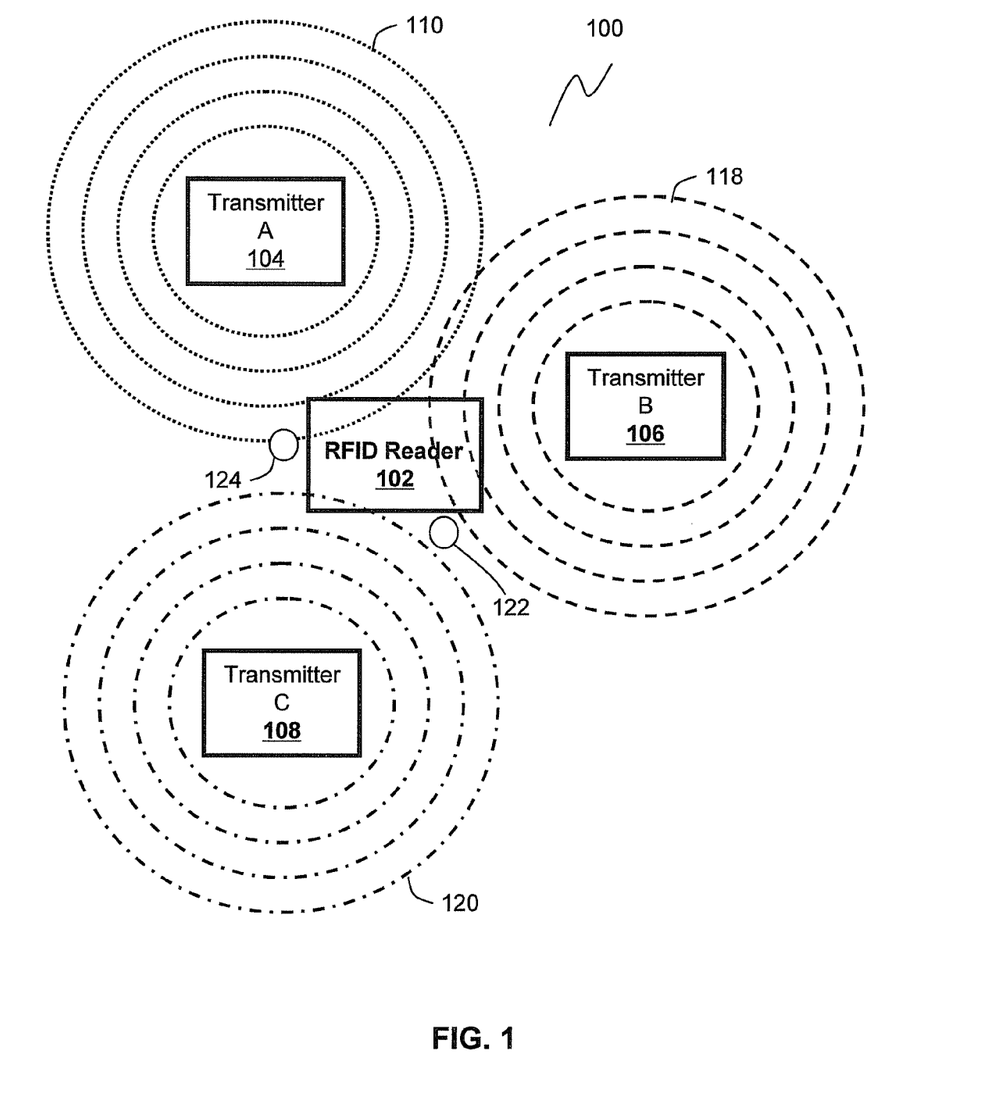
FIG. 1 shows a schematic block diagram of the overall system in accordance with an embodiment of the present invention.

A schematic diagram of the RFID reader localization system according to one embodiment of the present invention is shown in FIG. 1. The localization system 100 includes an RFID reader 102 for receiving RFID tag signals transmitted by both real and pseudo tags, and transmitters 104, 106 and 108. The transmitters 104, 106 and 108 are at known reference points, and transmit a sequence of unique RFID pseudo tag signals 110, 118 and 120, respectively. Preferably, the known reference points are at fixed locations. However, it should be apparent to a person skilled in the art that the location of an RFID reader may also be determined through trilateration or triangulation if the spatial variation of the known reference points can be determined by the RFID reader. Each of the pseudo tag signals 110, 118, 120 is uniquely identifiable by the RFID reader 102 as each pseudo tag signal comprises a transmitter identification value indicating which transmitter the pseudo tag was transmitted from and a tag identification (ID) indicating the power with which the pseudo tag signal was transmitted. Typically, the tag ID will correspond proportionally to the power of the pseudo tag transmission. As set forth in details in FIG. 3, the pseudo tag signals are each transmitted at a different power, giving each one a different range of reach. By knowing the fixed location of each transmitter 104, 106 and 108, together with the actual or relative range of the pseudo tag transmission from each transmitter, a trilateration calculation can be used to determine the location of the RFID reader 102.

In one embodiment, the RFID reader 102 is a mobile RFID reader such as a hand held terminal (HHT) held by an operator. The RFID reader 102 will generally be used in the identification of RFID tagged objects that are located within a suitable facility such as a warehouse. The RFID reader 102 can determine which RFID tags are in the vicinity, for example by emitting a ping signal causing nearby real RFID tags 122, 124 to transmit a real RFID signal back to the RFID reader 102 thereby indicating to the RFID reader 102 which real RFID tags 122, 124 are in the vicinity. Since real RFID tags generally have a very short range, their location is, to a good approximation, the same as the location of the reader. Also received by the RFID reader 102, are any unique pseudo tag signals transmitted in the sequences 110, 118 and 120 of pseudo tag signals from the transmitters 104, 106 and 108 of the localization system.

In one embodiment of the present invention the system 100 is located within a warehouse with transmitters 104, 106 and 108 residing in known locations throughout the warehouse such that pseudo tag signals emitted therefrom will be detectable to the RFID reader 102.

In the embodiment shown in FIG. 1 there are three transmitters. For the practical purpose of locating the RFID reader 102 in two dimensions in a warehouse, this is generally the minimum number of transmitters required for the operation of a trilateration based localization system. However, if, for example, the RFID reader 102 for which the location is being determined can only be located along a one-dimensional line, for example in a corridor, only one transmitter may suffice for determining the location of the RFID reader 102.

In practice there will typically be more transmitters in the localization system than the theoretical minimum necessary for calculating the location of the RFID reader 102. As a result, the system will have a sufficient number of transmitters sending pseudo tag signals detectable to the RFID reader 102 at any given time. Additionally, if more than the minimum number of transmitters is detectable to the RFID reader 102, the location of the RFID reader 102 can be determined using more than one triangulation or trilateration calculation thereby increasing the accuracy of the calculated location of the RFID reader 102.

Figure 2A:
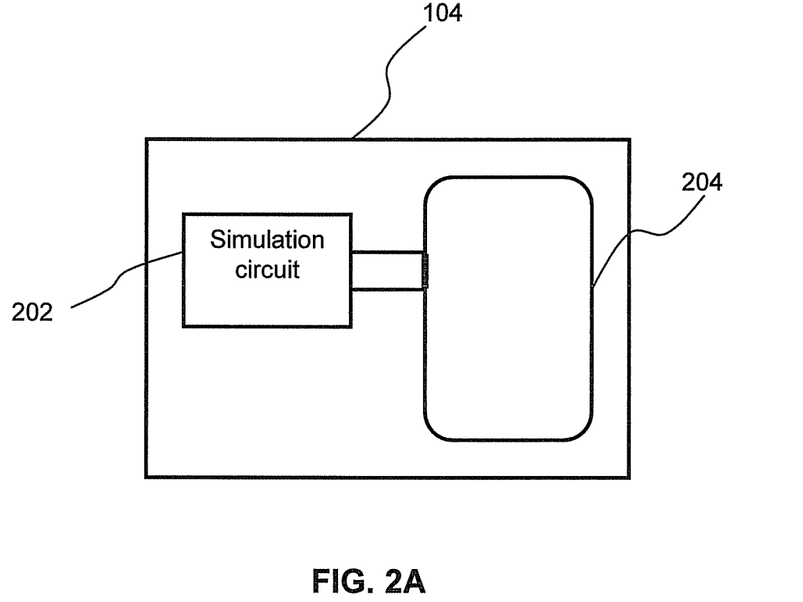
FIG. 2A shows a schematic block diagram of a transmitter.

As the localization system 100 is usually located within a warehouse or shop environment, the environment will generally contain a plurality of items that are being stored therein. There will also generally be a plurality of fixed and movable items including, for example, shelving, internal walls, items being stored and vehicles located in the warehouse. As such, these fixed or movable items may partially or fully obstruct one or more pseudo tag signals of the sequence transmitted from a transmitter thereby introducing error into the location calculation of the RFID reader 102. Accuracy of the location calculation can therefore be enhanced by increasing the number of the transmitters in the localization system, positioning the transmitters of the location system in a more suitable position, performing a plurality of triangulation calculations based on pseudo tag signals received from more than three transmitters, giving certain transmitters more weight when performing triangulation calculations and/or creating a rolling average of the location of the RFID reader and using logic to discredit inaccurate location calculations. Some of these options will be discussed in more detail below with reference to FIG. 2.

FIG. 2A is a schematic diagram providing further detail of, for example, the transmitter 104. Within transmitter 104 is a simulation circuit 202 and an antenna 204. The simulation circuit 202 simulates a plurality of RFID tags, and transmits the simulated RFID tag signals through the antenna 204. An RFID reader within the range of the transmitter 104 receives one or more of these simulated RFID tag signals. As the RFID tag signals transmitted from the transmitter are not real tag signals representing an item, they are referred to as pseudo tag signals.

Figure 2B:
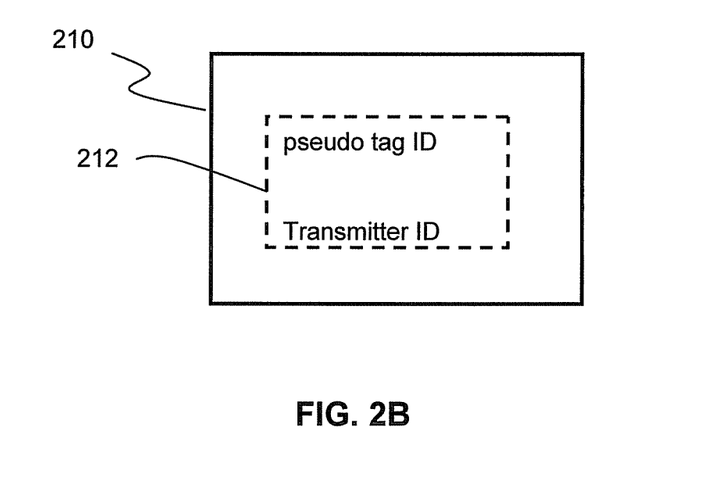
FIG. 2B shows a schematic block diagram of a peudo tag.

FIG. 2B is a schematic diagram of a pseudo tag 210 that is, for example, implemented in and transmitted by the transmitter 104. It is noted that the pseudo tag 210 is not a physical entity but rather an electronic representation of an RFID tag that is generated by the simulation circuit 202.

The pseudo tag 210 has information 212 associated therewith. This information may be stored in the simulation circuit 202. The information 212 includes a unique transmitter identification value (transmitter ID) and a tag identification (tag ID), wherein these two parameters combine to create a unique parameter or identity, which the RFID reader 102 can recognize and a triangulation or trilateration calculation can be made therefrom. Additional information may be included to facilitate distinguishing pseudo tag values from real tags as necessary. In one example, the transmitter ID is 4, the tag ID is 99 and a distinguisher value of 9990000000 is used. These IDs may be combined to produce, for example, a tag parameter of 9990000000+(4*256)+99 or 9990001123. In the embodiment the location of the transmitter 104 is stored in the RFID reader 102. Alternatively, the transmitter location may be stored as part of the information 212. The transmitter then transmits its location as part of the transmission from the pseudo tags located therein.

Figure 3:
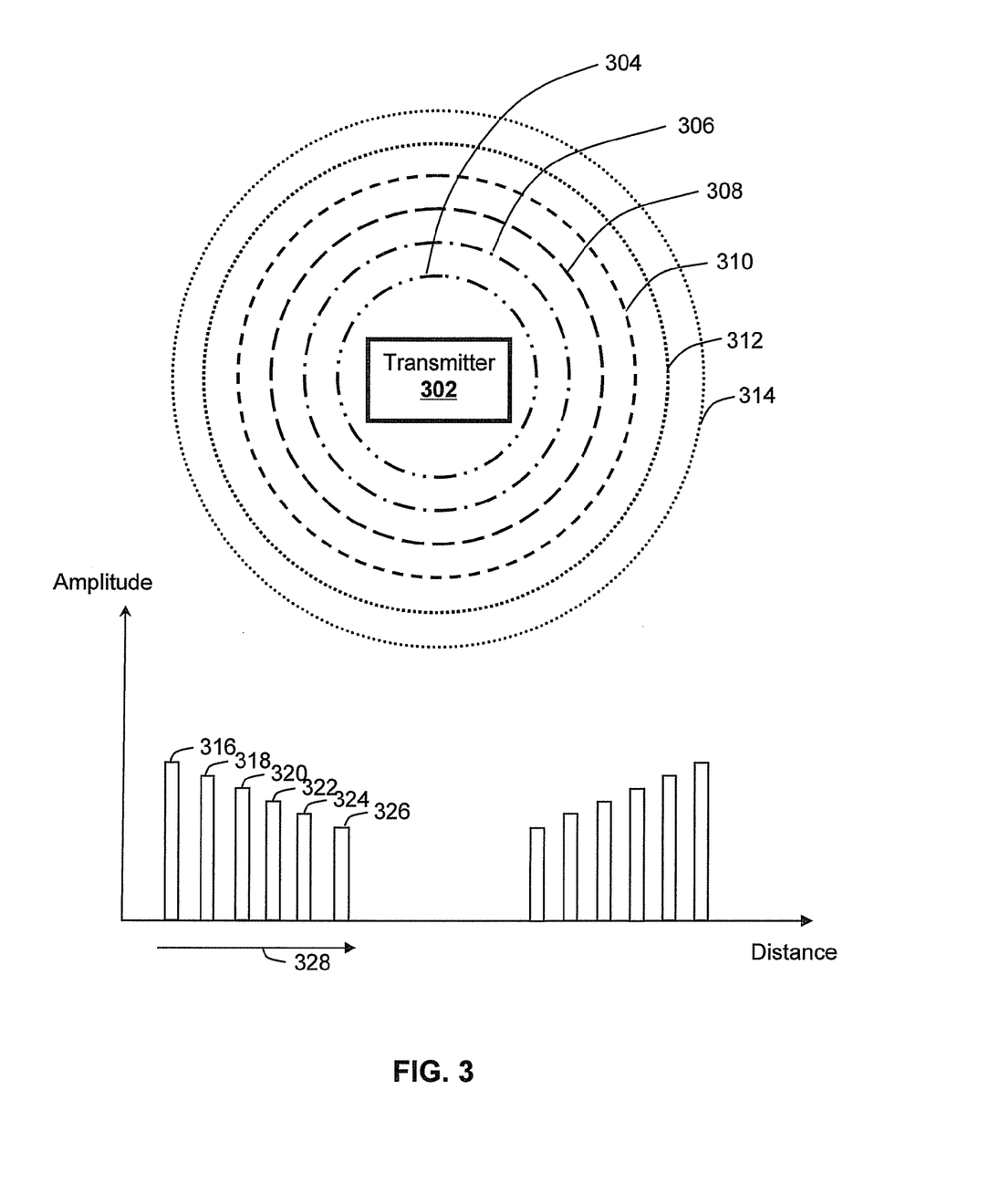
FIG. 3 shows a transmitter transmitting a plurality of pseudo tag signals with different signal strengths.

Also referring to FIG. 3, the transmitter 302 transmits each pseudo tag signal 304, 306, 308, 310, 312 using a different signal strength 326, 324, 322, 320, 318, 316 thereby forming a sequence 328 of unique pseudo tag signals 304, 306, 308, 310, 312. For example, each unique pseudo tag signal of the sequence may be transmitted using a progressively stronger signal. The number of tags detectable to a RFID reader is inversely proportional to its distance from the transmitter. For example, the transmitter may transmit successive tags each of which is detectable 2 meters further away than its predecessor. If the transmitter sends fifty pseudo RFID tag signals, the RFID reader would need to be within 100 metres of the transmitter to see at least one tag. If it were within 10 metres of the transmitter it would see 45 pseudo RFID tag signals.

The simulation circuit 202 of the transmitter 104 stores information related to the one or more pseudo tag signals, and generates simulated RFID signals analogous to those generated by real RFID tags.

A transmitter may be powered, for example, by an external or wired power supply to eliminate any lifetime or maintenance issues that are associated with an internal power source. However, a battery-based system is also possible. With many RFID readers generally being quite sensitive with respect to their ability to detect RF signals the transmission power of the antenna 204 can be quite small providing reasonable lifetimes for a battery based system.

The number of pseudo tags associated with a given transmitter and transmitted in the sequence of pseudo tag signals may be configurable from transmitter to transmitter and is a function of the location of a transmitter with regard to the possible location of RFID readers for which the location is to be determined. The number is also a function of the resolution required for determining the location of a RFID reader, and the abilities of the RFID reader to read more than one tag at a time. For example, each of the transmitters 104, 106 and 108 may simulate 50 pseudo RFID tag signals.

In the embodiment described in the above the location calculation is performed in the RFID reader 102. In an alternative embodiment the RFID reader 102 stores the scanned pseudo RFID tag signals and then sends the pseudo tags and the real tags to another computer with which it is in communication. The other computer would typically be a server in the warehouse. This server would then perform the location calculation. However, this embodiment may introduce a delay by having to relay the stored information between the RFID reader 102 and the server. Alternatively, the RFID reader 102 would let the user know whether or not a location had been computed successfully by, for example, beeping or vibrating. If the location could not be computed, a rescan could be attempted to acquire more pseudo tags for re-calculating the location of the RFID reader.

Figure 4:
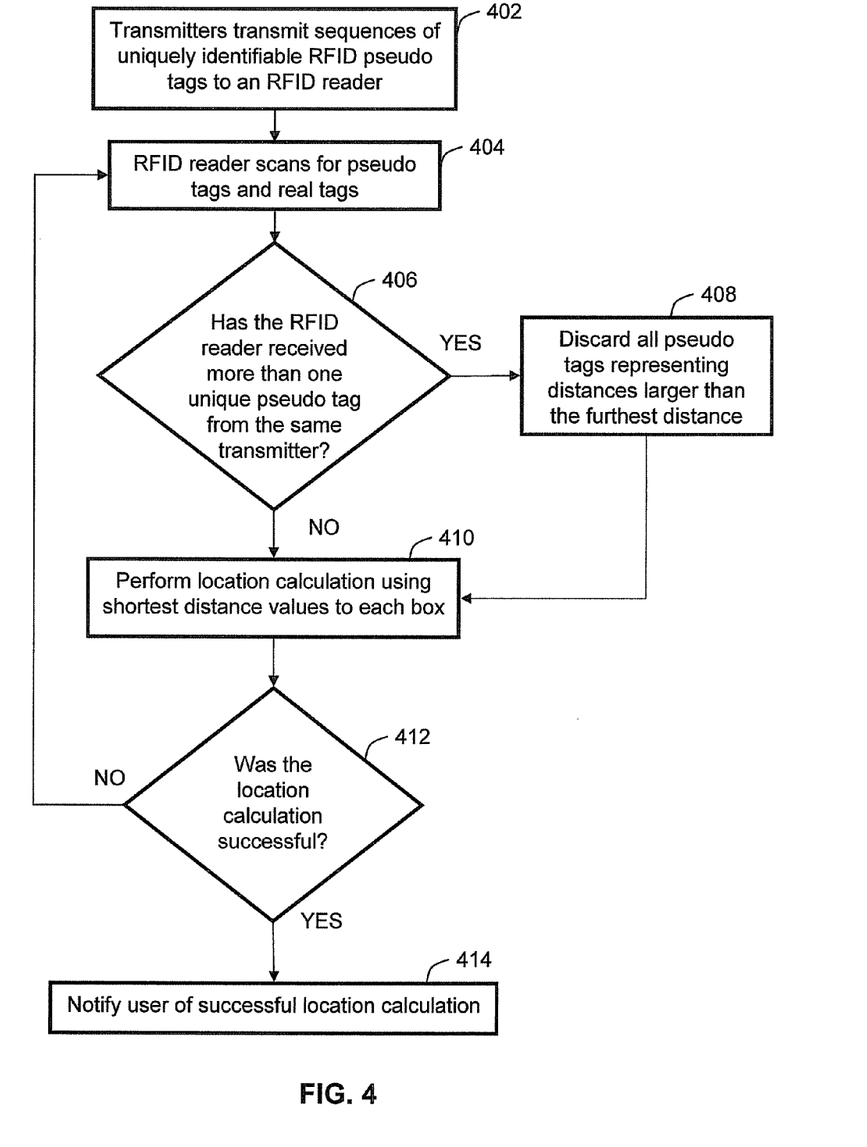
FIG. 4 shows a flow chart of a method of determining the location of an RFID reader.

FIG. 4 is a flowchart of a method of localization of an RFID reader according to one embodiment of the present invention. In the current embodiment, transmitters, such as transmitters 104, 106 and 108 of FIG. 1 will continuously transmit a repeated sequence of pseudo tag signals at regular intervals in step 402. This sequence of pseudo tag signals is continuously repeated, as the ping signal sent by the RFID reader 102 to activate the real RFID tags is unlikely to be detected by the transmitters. At step 404 the RFID reader 102 scans for signals from both the pseudo tags and the real tags. The RFID reader 102 receives signals from one or more real tags that were within a vicinity to receive the ping, and additionally receives the pseudo tags transmitted by the transmitters in step 302. The RFID reader 102 will receive these signals each time it does a scan as would be done at step 404. If the RFID reader 102 is close to a particular transmitter, it might receive almost all of the pseudo tag signals from that transmitter. If it is much farther away it might only receive a few pseudo tag signals. Thus the distance between the RFID reader 102 and the transmitter can be determined based on the pseudo tag ID that is detected which corresponds to the pseudo tag having the shortest range. The RFID reader 102 will continue to scan for an additional small period of time, gathering as many pseudo tags from as many transmitters as it can. The RFID reader 102 then determines if more than one pseudo tag has been received from a single transmitter in step 406. If more then one pseudo tag from a single transmitter has been received, the RFID reader 102 discards them all except for the weakest pseudo tag or the pseudo tag representing the smallest range from the transmitter, for each transmitter detected in step 408. The distance between the RFID reader and a detectable transmitter is determined at step 410. The RFID reader 102 extracts the range from each of the pseudo tags from the individual transmitters and uses the values as the raw input to one or more suitable triangulation trilateration algorithms.

It is worth noting that in some embodiments, the pseudo tag ID will represent a relative distance, not an absolute one, so there is no need for any real calibration of this system. For example, if the weakest tag detectable from three separate transmitters is "10", you are equidistant from each of them. The actual distance represented by the tag ID is not important as one can compute absolute location just by knowing the absolute locations of the transmitters and their relative distances.

Figure 5:
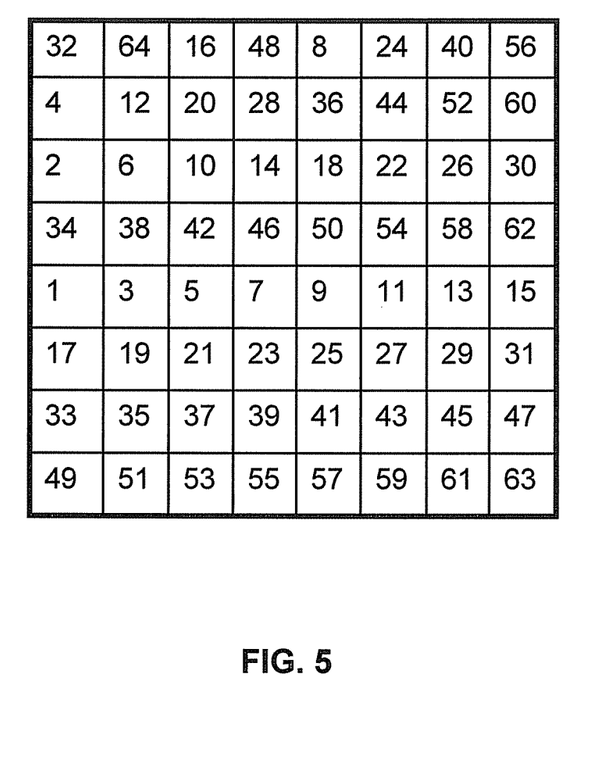
FIG. 5 illustrates an example of an increasing granularity to locate the RFID reader.

In one embodiment the pseudo tag signals from a transmitter are transmitted using a sequence having a granularity from coarse to fine. A coarse set is transmitted first, then with intermediate distances are transmitted in successive passes. Referring to FIG. 5 where an exemplary embodiment of the increasing granularity is shown, if the transmitter sent 64 tags in a sequence, a good illustrative ordering would be 32, 64, 16, 48, 8, 24, 40, 56, 4, 12, 20, 28 . . . 2, 6, 10 . . . 1, 3, 5, 7, 9 . . . etc. In other words, every $32^{nd}$ tag is sent first, then every $16^{th}$ tag, then every $8^{th}$ tag and so on up to every $2^{nd}$ tag. This approach allows an RFID reader to stop processing scans as soon as it received the pseudo RFID tag signal with the resolution it needed, for example, if the RFID reader only needed location accuracy to +/−8 units, then it could stop scanning and start computing as soon as it receives a RFID tag signal that is a multiple of 4, since the last pseudo tag it saw was a multiple of 8. This should also reduce intra-transmitter interference. In a simpler alternative illustrative embodiment, a transmitter may transmit the pseudo tag signals in order of increasing magnitude. In this case the first signal from a transmitter that is detectable to a RFID reader is the one to be used in the location calculation in step 510.

It may then be determined if a successful location calculation was made in step 512. If the RFID reader 102 received pseudo tag signals from a minimum number of transmitters to permit triangulation or trilateration of the location, then a successful location calculation can be made. Otherwise, the RFID reader 102 must repeat step 404 and once again scan for pseudo tag signals. If a successful location calculation has been made, the user may be notified 414 by means of an auditory alert such as a chirp or beep, or a mechanical alert such as a vibration.

No calibration of the system is required if the power difference between each successive pseudo tag in a sequence is substantially equal for each transmitter.

It should be apparent to a person skilled in the art that many approaches can be used to compensate the needed location correction when the RFID reader 102 is moving about or obscured. Two correction algorithms are briefly described here.

In the first algorithm the location information of the RFID reader is accumulated over time using a rolling average. The algorithm looks at the locational history of the RFID reader and determine what the likely location will be. Therefore if the RFID reader has been in the same location over the past several determinations it is likely that it is still in the same location. Thus, the temporary obscuring of a transmitter can be dealt with if it is found that the location to the other transmitters has remained the same. Further, if an operator that is on foot is holding the RFID reader, it is reasonable to limit the maximum possible change in distance of the RFID reader to that associated with a speed of about 4 km/h.

A second approach to improve the accuracy of the calculated location is to provide a weighting to the transmitters in the location calculation such that proximate transmitters are assumed to be more accurate than distant ones. For example, if ten transmitters, numbered from 1 to 10, are arranged in a line 10 m apart, and the RFID reader is next to transmitter 1, the RFID reader should indicate distances of 0 m from transmitter 1, 10 m from transmitter 2, 20 m from transmitter 3, 30 m from transmitter 4 and so on. However, if the RFID reader finds that it is 40 m from transmitter 3, an error has likely occurred and that at least one of the signals from one or more transmitters is being inaccurately received by the RFID reader. It must then be determined which signal is being inaccurately received. A site-specific weighting may also be applied in this case. This is most useful when there are more transmitters detectable than the minimum number required for the location determination as some transmitters will be located in plain sight whilst others could be prone to being obscured.

In all of the above examples, each transmitter must transmit the pseudo tag signals in such a way that an RFID reader sees the output pseudo tag signals as a set of standard tags i.e. there are a number of different proprietary formats including a UPC/EAN standardized format. It should not swamp the real tags on the products, as the normal back-off strategy will not be available, and the RFID reader's ping signal is almost certainly too weak to be used as a trigger to the transmitter, so the transmitter will have to transmit almost continuously. Where a modern tag reader able to handle almost a thousand scans a second is used, the transmitter may send a burst sequence (lasting about 50 ms) a few times a second.

As a further precaution so as to not overload the RFID reader with information the transmitters may be designed to communicate with each other and co-ordinate their activities. This co-ordination ensures that the transmitters do not all transmit at the same time. There are a number of ways of achieving this synchronization, a simple option is for each transmitter to radiate a low-frequency signal indicating to the other transmitters when it is going to transmit. On receipt of such a signal, a transmitter should try to ensure its own transmission is not in a slot being used by another transmitter. If it is in such a slot the transmitter should pick a new slot at random and transmit the pseudo tag signals.

The present invention has been described with regard to a plurality of illustrative embodiments. However, it will be apparent to persons skilled in the art that a number of variations and modifications can be made without departing from the scope of the invention as defined in the claims.

Embodiments within the scope of the present invention can be implemented in digital electronic circuitry, or in computer hardware, firmware, software, or in combinations thereof. Apparatus within the scope of the present invention can be implemented in a computer program product tangibly embodied in a machine-readable storage device for execution by a programmable processor; and method actions within the scope of the present invention can be performed by a programmable processor executing a program of instructions to perform functions of the invention by operating on input data and generating output. Suitable processors include, by way of example, both general and special purpose microprocessors. Generally, a processor will receive instructions and data from a read-only memory and/or a random access memory. Any of the foregoing can be supplemented by, or incorporated in, ASICs (application-specific integrated circuits).

What is claimed is:

1. A system for determining a location of a radio frequency identification (RFID) reader, the system comprising:
    a plurality of transmitters having known reference points, each transmitter comprising a simulation circuit for transmitting a sequence of unique RFID pseudo tag signals, each unique RFID pseudo tag signal in the sequence having a unique range of transmission, each unique RFID pseudo tag signal in the sequence comprising a tag identification indicating the range of transmission of the pseudo tag signal and a transmitter identification value indicating the transmitter transmitting the pseudo tag signal;
    an RFID reader for receiving a plurality of sequences of the unique RFID pseudo tag signals from the plurality of transmitters, and distinguishing between each unique RFID pseudo tag signal received; and
    a location calculator for calculating the location of the RFID reader based on the range of transmission received from the plurality of the received tag identifications and based on the plurality of the received transmitter identification values.

2. The system according to claim 1, wherein each unique RFID pseudo tag signal in the sequence has a progressively weaker signal and therefore a progressively shorter range of transmission such that the number of unique RFID pseudo tags received by the RFID reader is inversely proportional to its distance from the transmitter.

3. The system according to claim 1, wherein the plurality of transmitters is three, and the location calculator triangulates the location of the RFID reader based on the range of transmission indicated in the tag identification and the location of the transmitter in the transmitter identification value.

4. The system according to claim 1, wherein the RFID reader comprises the location calculator.

5. The system according to claim 4, wherein the RFID reader notifies a user once the location calculator has successfully calculated the location of the RFID reader.

6. The system according to claim 3, wherein the location calculator comprises an algorithm for applying a greater weight to the unique pseudo RFID tag signals having a shorter range of transmission relative to pseudo RFID tag signals received from transmitters having a longer range.

7. The system according to claim 3, wherein the location calculator comprises an algorithm for accumulating location information over time using a rolling average to generate a locational history and substantially determining what a current location of the RFID reader is based on the locational history.

8. The system according to claim 1, wherein the plurality of transmitters is at least four; and
    a plurality of triangulation calculations are performed to determine the location of the RFID reader based on the tag identifications and the transmitter identification values.

9. The system according to claim 1, wherein the location calculator is located in a server computer and the tag identification and the transmitter identification value of received pseudo tag signals are transmitted from the RFID reader to the location calculator in the server computer.

10. A method of determining the location of a radio frequency identification (RFID) reader, the method comprising:
    transmitting a sequence of unique RFID pseudo tag signals from each of a plurality of sources to the RFID reader, each source having a known reference point, each unique RFID pseudo tag signal in the sequence comprising a tag identification indicating a unique range of transmission of the unique RFID pseudo tag signal and a transmitter identification value indicating the source from which the RFID pseudo tag signal is transmitted;
    receiving a plurality of sequences of the unique RFID pseudo tag signals from the plurality of sources,
    distinguishing between each unique RFID pseudo tag received by the RFID reader; and
    calculating the location of the RFID reader based on the range of transmission received from the plurality of the received tag identifications and based on the plurality of the received transmitter identification values.

11. The method according to claim 10, wherein each unique RFID pseudo tag in the sequence has a progressively weaker signal and therefore a progressively decreased range of transmission such that the number of unique RFID pseudo tag signals received by the RFID reader is inversely proportional to its distance from the source.

12. The method according to claim 11, further comprising:
discarding any tag identifications received by the RFID reader which have the same transmitter identification value and a tag identification indicating a range of transmission higher than a minimum received by the RFID reader resulting in a minimum range tag identification for each source; and wherein the calculating comprises calculating the location of the RFID reader based on the minimum range tag identification for each source and the transmitter identification value for each minimum range tag identification.

13. The method according to claim 10, wherein the plurality of sources is three, further comprising:
calculating the location of the RFID reader by triangulation of the RFID reader based on the range of transmission indicated in the tag identification and the location of the source in the transmitter identification value in the unique RFID pseudo tags.

14. The method according to claim 10, wherein the RFID reader calculates the location.

15. The method according to claim 10, further comprising:
notifying a user once the location of the RFID reader has been successfully calculated.

16. The method according to claim 10, wherein the plurality of sources is three, the method further comprising:
applying a greater weight to RFID pseudo tags received by the RFID reader from sources which are closer in distance to the RFID reader.

17. The method according to claim 10, wherein the plurality of sources is three, the method further comprising:
accumulating location information over time using a rolling average to generate a locational history; and
determining what a current location of the RFID reader is based on the range of transmission indicated in the tag identification and the location of the source from which each pseudo tag signal was transmitted obtainable from the transmitter identification value in the unique RFID pseudo tags received by the RFID reader and on the locational history.

18. The method according to claim 13, wherein a server calculates the location of the RFID reader, the method further comprising:
transmitting a signal from the server to the RFID reader upon successful calculation of the location of the RFID reader; and
notifying the user upon receipt of the signal indicating a successful calculation.

* * * * *